(12) United States Patent
Kwon et al.

(10) Patent No.: US 11,180,819 B2
(45) Date of Patent: Nov. 23, 2021

(54) GRAIN-ORIENTED ELECTRICAL STEEL PLATE AND PRODUCTION METHOD THEREFOR

(71) Applicant: POSCO, Pohang-si (KR)

(72) Inventors: Oh-Yeoul Kwon, Pohang-si (KR); Seung Gon Lee, Pohang-si (KR); Hyun-Chul Park, Pohang-si (KR); Jung Hun Park, Pohang-si (KR); Seong-Kyu See, Pohang-si (KR); Sung-Yeun Won, Pohang-si (KR); Jae-Kyoum Kim, Pohang-si (KR); Jong-Tae Park, Pohang-si (KR); Se Min Park, Pohang-si (KR)

(73) Assignee: POSCO, Pohang-si (KR)

( * ) Notice: Subject to any disclaimer, the term of this patent is extended or adjusted under 35 U.S.C. 154(b) by 165 days.

(21) Appl. No.: 15/539,637

(22) PCT Filed: Dec. 21, 2015

(86) PCT No.: PCT/KR2015/014034
§ 371 (c)(1),
(2) Date: Jun. 23, 2017

(87) PCT Pub. No.: WO2016/105053
PCT Pub. Date: Jun. 30, 2016

(65) Prior Publication Data
US 2018/0010206 A1 Jan. 11, 2018

(30) Foreign Application Priority Data

Dec. 24, 2014 (KR) .................. 10-2014-0189059
Dec. 14, 2015 (KR) .................. 10-2015-0178456

(51) Int. Cl.
*B32B 3/30* (2006.01)
*C21D 8/12* (2006.01)
(Continued)

(52) U.S. Cl.
CPC ........ *C21D 8/1283* (2013.01); *B23K 26/0622* (2015.10); *B23K 26/364* (2015.10);
(Continued)

(58) Field of Classification Search
CPC .......... C21D 9/46; C21D 8/12; C21D 8/1222; C21D 8/1233; C21D 8/1277;
(Continued)

(56) References Cited

U.S. PATENT DOCUMENTS 6,287,703 B1 *  9/2001  Inokuti ................ C21D 8/1277
                                                       148/307
9,881,720 B2 *  1/2018  Schoen ................ C21D 8/1255
(Continued)

FOREIGN PATENT DOCUMENTS

CN    1256321 A    6/2000
CN    1529764 A    9/2004
(Continued)

OTHER PUBLICATIONS

Forsterite Mineral Data. Obtained from webmineral.com on Jun. 19, 2019. (Year: 2019).*
(Continued)

*Primary Examiner* — Megha M Gaitonde
(74) *Attorney, Agent, or Firm* — Morgan, Lewis & Bockius LLP

(57) ABSTRACT

Provided is an oriented electrical steel sheet including a groove existing on the surface of the electrical steel sheet and a forsterite layer formed on a part or all of the surface of the electrical steel sheet, in which forsterite which is extended from the forsterite layer and penetrates to a base steel sheet in an anchor form is present on the surface of the side of the groove.

18 Claims, 1 Drawing Sheet

(51) Int. Cl.
| | |
|---|---|
| *H01F 1/18* | (2006.01) |
| *C22C 38/00* | (2006.01) |
| *B23K 26/40* | (2014.01) |
| *B23K 26/0622* | (2014.01) |
| *B23K 26/364* | (2014.01) |
| *C21D 9/46* | (2006.01) |
| *C22C 38/02* | (2006.01) |
| *C22C 38/04* | (2006.01) |
| *C22C 38/06* | (2006.01) |
| *C23C 8/18* | (2006.01) |
| *B23K 101/34* | (2006.01) |
| *B23K 103/04* | (2006.01) |

(52) U.S. Cl.
CPC ............... *B23K 26/40* (2013.01); *C21D 8/12* (2013.01); *C21D 8/1222* (2013.01); *C21D 8/1233* (2013.01); *C21D 8/1244* (2013.01); *C21D 8/1255* (2013.01); *C21D 8/1261* (2013.01); *C21D 8/1272* (2013.01); *C21D 8/1288* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 8/18* (2013.01); *H01F 1/18* (2013.01); *B23K 2101/34* (2018.08); *B23K 2103/04* (2018.08); *C21D 2201/05* (2013.01)

(58) Field of Classification Search
CPC ............... C21D 8/1283; C21D 8/1288; C21D 2201/05; B32B 15/013; B32B 15/04; B32B 15/043; B32B 15/18; B32B 3/26; B32B 3/263; B32B 3/30; H01F 1/18; Y01T 428/24174; Y01T 428/24479; Y01T 428/24521; Y01T 428/24537; Y01T 248/24545; Y01T 428/2457; Y01T 428/24612; Y01T 428/2462; Y01T 428/24942; Y01T 428/2495
USPC ....... 428/119, 156, 161, 163, 164, 167, 172, 428/173, 212, 213
See application file for complete search history.

(56) References Cited

U.S. PATENT DOCUMENTS

| | | | |
|---|---|---|---|
| 2013/0098508 | A1 | 4/2013 | Yamaguchi et al. |
| 2013/0189490 | A1* | 7/2013 | Watanabe ................. H01F 1/18 |
| | | | 428/164 |

FOREIGN PATENT DOCUMENTS

| | | | |
|---|---|---|---|
| CN | 101952462 A | 1/2011 |
| EP | 1004680 A1 | 5/2000 |
| EP | 1411139 A1 | 4/2004 |
| EP | 3048180 A1 | 7/2016 |
| JP | S56-123325 A | 9/1981 |
| JP | S59-226115 A | 12/1984 |
| JP | H01-198430 A | 8/1989 |
| JP | H04-272183 A | 9/1992 |
| JP | H06-065753 A | 3/1994 |
| JP | H06-100937 A | 4/1994 |
| JP | H06-184639 A | 7/1994 |
| JP | H06-200325 A | 7/1994 |
| JP | H07-192891 A | 7/1995 |
| JP | H08-319514 A | 12/1996 |
| JP | H09-249916 A | 9/1997 |
| JP | 11-158645 A | 6/1999 |
| JP | 11-279644 A | 10/1999 |
| JP | 2006-152383 A | 6/2006 |
| JP | 2006-274394 A | 10/2006 |
| JP | 2011-510166 A | 3/2011 |
| JP | 2012-12666 A | 1/2012 |
| JP | 2012-31518 A | 2/2012 |
| JP | 2012-177164 A | 9/2012 |
| JP | 2014-91839 A | 5/2014 |
| JP | 2014-152393 A | 8/2014 |
| KR | 10-2009-0049611 A | 5/2009 |
| KR | 10-2013-0020933 A | 3/2013 |
| KR | 10-2013-0045938 A | 5/2013 |
| KR | 10-2014-0135833 A | 11/2014 |
| WO | 2004-083465 A1 | 9/2004 |

OTHER PUBLICATIONS

Extended European Search Report dated Dec. 22, 2017 issued in European Patent Application No. 15873580.3.
Summons to attend oral proceedings pursuant to Rule 115(1) EPC dated Jul. 19, 2021 issued in European Patent Application No. 15873580.3.

* cited by examiner

GRAIN-ORIENTED ELECTRICAL STEEL PLATE AND PRODUCTION METHOD THEREFOR

CROSS-REFERENCE TO RELATED APPLICATIONS

This application is the U.S. National Phase of PCT/KR2015/014034 filed Dec. 21, 2015, which claims priority to Korean Patent Application No. 10-2014-0189059 filed Dec. 24, 2014 and Korean Patent Application No. 10-2015-0178456 filed Dec. 14, 2015. The subject matter of each is incorporated herein by reference in entirety.

TECHNICAL FIELD

The present invention relates to an oriented electrical steel sheet.

BACKGROUND ART

An oriented electrical steel sheet is used as an iron core material for energy conversion of electric devices such as a transformer by developing an easy magnetization axial texture in a rolling direction. In order to improve energy conversion efficiency by reducing power loss when the transformer is applied, a steel sheet with low iron loss and an excellent magnetic flux density characteristic is required.

Generally, the oriented electrical steel sheet means a material having a Goss texture oriented in {110}<001> orientation (so called a 'Goss orientation') in a rolling direction through hot-rolling, cold-rolling, and annealing processes. In such an oriented electrical steel sheet, the {110}<001> orientation has an excellent magnetic characteristic as the degree oriented in the easy magnetization axial direction of iron is high.

In a process of manufacturing the oriented electrical steel sheet, first, a steel material having a composition required for the electrical steel sheet is manufactured to a slab, the slab is heated, and then hot-rolling is performed to manufacture a hot-rolled steel sheet.

Next, for the hot-rolled steel sheet is selectively subjected to hot-rolled steel annealing if necessary, and then once or if necessary, subjected to cold-rolling several times to manufacture a cold-rolled steel sheet having a required thickness.

The manufactured cold-rolled steel sheet is subjected to primary recrystallization annealing (the primary recrystallization annealing is referred to as "decarburization annealing" because primary recrystallization is performed simultaneously with decarburization) and applied with an annealing separator. In this case, during the primary recrystallization annealing or after the primary recrystallization annealing is completed, before secondary recrystallization annealing (since secondary recrystallization occurs and then a crystallization structure having a Goss orientation required for the electrical steel sheet is formed, the recrystallization annealing is referred to as 'final annealing' or 'finish annealing') is performed, a nitride process is selectively performed if necessary for the purpose of strengthening an inhibitor.

After the primary recrystallization annealing is completed, in the case of applying an annealing separator and performing secondary recrystallization annealing, a forterite film is formed on the surface of a steel sheet according to a kind of annealing separator. As such, after the secondary recrystallization annealing is performed, planarization annealing is selectively performed to correct the shape of the steel sheet. In addition, before or after the planarization annealing, in order to apply tension to the steel sheet, if necessary, tension coating is performed.

In this case, the tension coating is referred to as insulation coating because a thin insulation coating is formed on the surface of the steel sheet when an inorganic coating solution or an organic-inorganic complex coating solution is applied on the surface of the steel sheet and baking is performed.

As such, when the insulation coating is performed on the electrical steel sheet, iron loss is reduced by applying tension to the steel sheet to improve a magnetic characteristic of the electrical steel sheet. The oriented electrical steel sheet manufactured above is subjected to shearing and punching in a shape which may be used for a transformer and the like. As such, in the case of performing shearing and punching, stress removal annealing is performed to remove stress generated during the process if necessary.

In the oriented electrical steel sheet manufactured according to such a process, a method of refining a magnetic domain that reduces a width of a magnetic domain is used for improving a magnetic characteristic. By the method of refining the magnetic domain, a linear groove is formed on the surface of the electrical steel sheet by a physical means. As a physical means forming the groove, a method of irradiating a laser is preferred.

The method of refining the magnetic domain may be classified into permanent refinement of the magnetic domain and permanent refinement of the magnetic domain depending on whether or not to maintain an improvement effect of refinement of the magnetic domain even after stress removal annealing.

The temporal refinement method of the magnetic domain that forms the groove by irradiating the laser may be performed in an intermediate step or a post step of the process of manufacturing the electrical steel sheet. That is, after the final cold-rolling, before or after the primary recrystallization, before or after the secondary recrystallization annealing, or before or after planarization annealing, the groove may be formed.

However, in the case of forming the groove by irradiating the laser, according to which step of the manufacturing process of the electrical steel sheet is performed, the insulation coating is separated from the groove portion formed on the surface of the steel sheet and thus, there may be a problem in that the insulation of the electrical steel sheet is deteriorated. Further, in the case of forming the groove by irradiating the laser, excessive stress is concentrated at the groove portion and as a result, a base coating layer or an insulating layer may be broken on the surface of the groove side.

Accordingly, in order to ensure an insulation characteristic of the electrical steel sheet, it is required to ensure adhesion between the base steel sheet and the coating layer after forming the groove. Further, when the excessive stress is concentrated in the groove when forming the groove and thus the base coating layer or the insulating layer is broken, it is required to solve the problem that corrosion resistance or an electric insulation property of the electrical steel sheet is not ensured.

DISCLOSURE

Technical Problem

The present invention has been made in an effort to provide an electrical steel sheet having advantages of an excellent iron loss improvement characteristic by residual stress of a forsterite layer around a groove formation portion and excellent adhesion with a coating layer applied after forming the groove.

Further, the present invention has been made in an effort to provide a manufacturing method having advantages of strengthening bonding force between a forsterite coating and a base steel sheet when the forsterite coating is formed on the surface of the oriented electrical steel sheet.

Technical Solution

An exemplary embodiment of the present invention provides an oriented electrical steel sheet including: a groove existing on the surface of the electrical steel sheet; and a forsterite layer formed on a part or all of the surface of the electrical steel sheet, in which one or more forsterite anchors having a 3D network structure which are integrally extended from the forsterite layer and formed to a base steel sheet are present on the surface of the side of the groove.

Two or more forsterite anchors having the 3D network structure which are formed to the base steel sheet may be present within 50 μm from the surface of the side of the groove.

The forsterite anchor having the 3D network structure which is formed to the base steel sheet may have a length of ⅓ or more of a mean thickness of the forsterite layer. A length in a thickness direction of the electrical steel sheet of the forsterite anchor having the 3D network structure which is formed to the base steel sheet may be 0.3 to 10 μm.

When a rolling direction of the electrical steel sheet is referred to as an x axis, a width direction of the electrical steel sheet is referred to as a y axis, a normal direction of an xy plane is referred to as a z axis, and the forsterite anchor having the 3D network structure which is formed to the base steel sheet is observed in an xz plane, the forsterite anchor may have a hook shape or an anchor shape. A width of the forsterite anchor having the 3D network structure may be 3.5 μm or less.

A mean thickness of the forsterite layer may be 0.1 μm to 3 μm.

A ratio of a hardness value of the base steel sheet at a portion where the forsterite layer and the base steel sheet contact each other and a hardness value of the base steel sheet at ½ point of the thickness of the base steel sheet may be 1.09 to 10.

In the oriented electrical steel sheet according to the exemplary embodiment of the present disclosure, an insulation coating layer may be further formed on the electrical steel sheet, the insulation coating layer may include silicate and metal phosphate, and the insulation coating layer may include 25 wt % or more of Mg or Al based on the weight of the insulation coating layer.

A depth of the groove may be 3% to 10% of the thickness of the electrical steel sheet.

The oriented electrical steel sheet may include O: 0.0020 to 0.0080 wt %, Si: 2.5 to 4.0 wt %, C: 0.02 to 0.10 wt %, Al: 0.02 to 0.04 wt %, Mn: 0.05 to 0.20 wt %, N: 0.002 to 0.012 wt %, S: 0.001 wt % to 0.010 wt % and P: 0.01 to 0.08 wt % based on the entire composition 100 wt % of the electrical steel sheet and the remainder may include Fe and impurities.

An angle between the groove and a width direction of the steel sheet may be parallel or 5° or less (not including 0°).

Another exemplary embodiment of the present invention provides a manufacturing method of an oriented electrical steel sheet including: manufacturing a cold-rolled steel sheet by heating at 1300° C. or less, hot-rolling, and then cold-rolling a slab including O: 0.0020 to 0.0080 wt % and a remainder of Fe and impurities based on the entire composition 100 wt % of the slab; subjecting the cold-rolled steel sheet to primary recrystallization annealing; applying an annealing separator containing MgO to the steel sheet subjected to the primary recrystallization annealing and subjecting the steel sheet to secondary recrystallization annealing; and refining a magnetic domain by forming a groove on the steel sheet, in which the refining of the magnetic domain is performed after the manufacturing of the cold-rolled steel sheet, after the primary recrystallization annealing is completed, or after the secondary recrystallization annealing is completed, and a weight ratio of $SiO_2/Fe_2SiO_4$ of an oxide layer on the surface of the steel sheet formed in the primary recrystallization annealing process is 0.1 to 1.5.

The primary recrystallization annealing may be performed in a dew point atmosphere of 60 to 70° C. (50% $N_2$+50% $H_2$) in a temperature range of 800 to 890° C.

An oxygen amount of the oxygen layer on the surface of the steel sheet formed in the primary recrystallization annealing process may be in a range of 600 to 1,000 ppm.

The annealing separator may be applied with 2.5 to 12 $g/m^2$ per side of the steel sheet in a slurry form by containing MgO as a main component and mixing a Ti compound, a Cl compound, a sulfide, a boride, a nitride, or an oxide as a reaction promoter singly or in plural therein.

MgO as the main component of the annealing separator may have a mean powder particle diameter of 2.5 μm or less.

MgO as the main component of the annealing separator having a mean powder particle diameter of 2 μm or less may be 10% or more.

The secondary recrystallization annealing may be performed by dividing a primary cracking process at 550 to 750° C. and a secondary cracking process at 1,000 to 1,250° C., and during temperature rising, the temperature may rise to 30 to 100° C. per hour in a temperature section of 650 to 950° C. and rise to 45° C. or less per hour in a temperature section of 950 to 1250° C.

In the secondary recrystallization annealing, the primary cracking time may be 10 minutes or more and the secondary cracking time may be 8 hours or more.

The secondary recrystallization annealing may be performed in a mixed atmosphere of nitrogen and hydrogen up to the secondary cracking temperature and performed in a hydrogen atmosphere after reaching the secondary cracking temperature.

A depth of the groove formed in the magnetic domain refining process may be 3% to 10% of the thickness of the electrical steel sheet.

An angel between the groove formed in the magnetic domain refining process and a width direction of the steel sheet may be parallel or 5° or less (not including 0°).

The refining of the magnetic domain may be performed by irradiating a continuous wave laser in a Gaussian beam form.

The manufacturing method of an electrical steel sheet may further include insulation-coating with an insulation coating solution containing colloidal silica and metal phosphate on the steel sheet after the refining of the magnetic domain.

The metal phosphate in the insulation coating solution may be Al phosphate, Mg phosphate, or a combination thereof, and the content of Al, Mg, or a combination thereof with respect to the weight of the insulation coating solution may be 15 wt % or more.

The slab may further include Si: 2.5 to 4.0 wt %, C: 0.02 to 0.10 wt %, Al: 0.02 to 0.04 wt %, Mn: 0.05 to 0.20 wt %, N: 0.002 to 0.012 wt %, S: 0.001 wt % to 0.010 wt % and P: 0.01 to 0.08 wt % based on the entire composition 100 wt % of the slab.

A forsterite coating and an insulation coating may be sequentially formed on the surface of the electrical steel sheet, and the forsterite coating may be integrally extended in a lower direction of the electrical steel sheet and penetrates to form a forsterite anchor having a 3D network structure.

Two or more forsterite anchors may be present within 50 μm from the surface of the side of the groove.

Advantageous Effects

According to the exemplary embodiment of the present invention, the oriented electrical steel sheet has an excellent iron loss improvement characteristic by residual stress of a forsterite layer around a groove formation portion and excellent adhesion with a coating layer applied after forming the groove.

Further, a forsterite coating is formed on the surface of the steel sheet and simultaneously, the coating is formed in a 3D network structure while penetrating into a base steel sheet, thereby strengthening bonding force between the forsterite coating and the base steel sheet.

MODE FOR INVENTION

Figure 1:
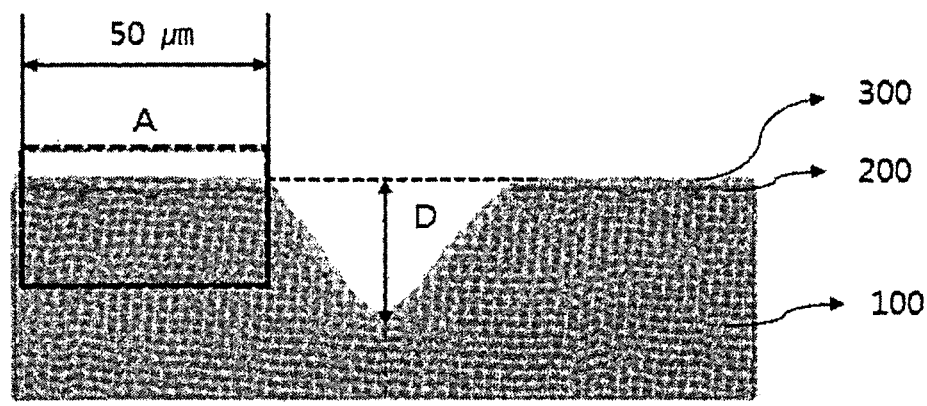
FIG. 1 is a diagram illustrating a cross section of a groove portion of an oriented electrical steel sheet according to an exemplary embodiment of the present invention.

Various advantages and features of the present invention and methods accomplishing thereof will become apparent from the following description of exemplary embodiments with reference to the accompanying drawings. However, the present invention is not limited to the following exemplary embodiments but may be implemented in various different forms. The exemplary embodiments are provided only to complete disclosure of the present invention and to fully provide a person having ordinary skill in the art to which the present invention pertains with the category of the disclosure, and the present invention will be defined by the appended claims. Throughout the whole specification, the same reference numerals denote the same elements.

Therefore, in some exemplary embodiments, well-known technologies are not described in detail in order to avoid an ambiguous interpretation of the present invention. Unless otherwise defined, all terms including technical and scientific terms used in the present specification may be used as the meaning which may be commonly understood by the person with ordinary skill in the art, to which this application pertains. Throughout the whole specification, unless explicitly described to the contrary, the word "comprise" and variations such as "comprises" or "comprising", will be understood to imply the inclusion of stated elements but not the exclusion of any other elements. Unless particularly stated otherwise in the present specification, a singular form also includes a plural form.

A manufacturing method of an oriented electrical steel sheet according to an exemplary embodiment of the present invention will be described.

First, a slab including O: 0.0020 to 0.0080 wt % and the remainder of Fe and impurities based on the entire composition 100 wt % of the slab is prepared. The slab may further include Si: 2.5 to 4.0 wt %, C: 0.02 to 0.10 wt %, Al: 0.02 to 0.04 wt %, Mn: 0.05 to 0.20 wt %, N: 0.002 to 0.012 wt %, S: 0.001 wt % to 0.010 wt % and P: 0.01 to 0.08 wt % based on the entire composition 100 wt % of the slab.

The reason for limiting the components will be described.

When Si is added with 2.5 wt % or more, a specific resistance is increased and iron loss is decreased, but when Si is more than 4.0 wt %, brittleness of the steel sheet is increased and a mechanical characteristic may be deteriorated.

When C is added with 0.02 wt % or more, a structure during hot-rolling is uniformed and the growth of a columnar structure caused by continuous casting may be suppressed, and when C is more than 0.10 wt %, a decarburization annealing time is increased and as a result, primary recrystal grains are refined, a secondary recrystallization temperature is decreased, and thus a magnetic property may be deteriorated.

When Al is added with 0.02 wt % or more, Al acts as a growth inhibitor of crystal grains in a nitride form. However, when Al is more than 0.04 wt %, coarse nitride is precipitates and thus the role of the inhibitor may be deteriorated.

When Mn is added with 0.05 wt % or more, sulfide is formed to act as the growth inhibitor of crystal grains. However, when Mn is more than 0.20 wt %, the size of the primary recrystal grains is reduced to make the secondary recrystallization unstable and Mn oxide is formed to lower the iron loss.

N is added with 0.002 wt % or more to act as the growth inhibitor of crystal grains. However, when N is more than 0.012 wt %, N may cause a surface defect called a blister.

When S is added with 0.001 wt % or more, sulfide is formed to act as the growth inhibitor of crystal grains. However, when S is more than 0.010 wt %, coarse sulfide is formed to be difficult to act as the growth inhibitor of crystal grains.

When P is added with 0.01 wt % or more, in terms of a fine structure, the growth of a {110}<001> adhesion texture may be promoted. However, when P is more than 0.08 wt %, the brittleness of the steel may be increased.

While O is included with 0.0020 to 0.0080 wt % of the slab, O additionally penetrates into the steel sheet in the primary recrystallization annealing process to increase the oxygen content in the steel. Accordingly, when the oxygen content in the steel is greater than the general oxygen content, an oxide layer of the base steel sheet is formed and the oxide layer easily diffuses Mg when the secondary recrystallization annealing is performed thereafter. Accordingly, forsterite penetrating into the base steel sheet may be formed.

The slab is heated. A temperature for heating the slab may be 1050 to 1300° C. Thereafter, a hot rolled sheet is manufactured by hot-rolling the slab.

In the hot-rolled sheet, if necessary, hot-rolled sheet annealing is performed cold-rolling is performed without performing the hot-rolled sheet annealing. In the case of performing the hot-rolled sheet annealing, the hot-rolled structure is heated at a temperature of 900° C. or more to be uniformed, cracked, and then cooled.

Thereafter, cold-rolling up to the final thickness by one cold-rolling or two or more cold-rolling including intermediate annealing is performed to manufacture a cold-rolled sheet with the final thickness.

Thereafter, a magnetic domain refining process in which a groove with a depth of 4% to 10% of the thickness of the electrical steel sheet is formed on the cold-rolled sheet may be performed. When the depth of the groove is less than 4%, the magnetic domain refining process for improving the iron loss is not sufficiently performed, and when the depth of the groove is more than 10%, a heat effect is excessive and the magnetic property may be deteriorated.

The groove of the steel sheet formed by the magnetic domain refining process may be formed after the final cold-rolling above, and the groove may be formed in a process between the primary recrystallization annealing and the secondary recrystallization annealing or a process between the secondary recrystallization annealing and the planarization annealing.

As the method of forming the groove by the magnetic domain refining process, a method of forming a groove by a mechanical method, a method of forming a groove by laser irradiation, or a method of forming a groove by chemical etching is included, and among the methods, the method of forming the groove by laser irradiation is preferred.

In the case, in the groove formed on the steel sheet by the laser irradiation, an angle between the formed groove and a width direction of the steel sheet may be parallel or 5° or less (not including 0°). As such, the angle between the formed groove and the width direction of the steel sheet is parallel or 5° or less (not including 0°) to increase an iron loss improvement rate.

Thereafter, the cold-rolled sheet is subjected to the primary recrystallization annealing. The primary recrystallization annealing may be performed by performing nitriding annealing after the decarburization annealing or performing the decarburization annealing and the nitriding annealing at the same time. In this case, an annealing temperature during the primary recrystallization annealing may be 700 to 950° C.

The primary recrystallization annealing is controlled in an oxidizing atmosphere for decarburization. In the case, Si included in the steel sheet reacts with water existing in decarburization annealing atmosphere gas to form an oxide layer on the surface of the steel sheet.

In the primary recrystallization annealing, the decarburization is performed by diffusing carbon in the steel sheet to the surface, and meanwhile, the steel sheet reacts with oxygen included in the atmosphere gas to form an oxide layer such as $SiO_2$ or $Fe_2SiO_4$ (Faylite) on the surface.

In this case, a weight ratio of $SiO_2/Fe_2SiO_4$ in the oxide layer formed on the surface of the steel sheet in the primary recrystallization annealing may be 0.1 to 1.5.

As such, the weight ratio of the oxide layer formed in the primary recrystallization annealing has a close relationship with a proper oxygen injection amount during the primary recrystallization annealing, that is, the decarburization annealing.

To this end, while the oxygen content in the components of the steel sheet is greater than the general oxygen content, an oxygen injection amount during the decarburization annealing is controlled. The oxygen injection amount during the decarburization annealing needs to consider an oxidizing atmosphere (a dew point, a hydrogen atmosphere), a shape of the oxide layer of the surface of the steel sheet, and the temperature of the steel sheet. If it is judged only by the oxidizing ability, the higher the oxidizing ability, the higher the oxygen partial pressure, and as a result, the oxidizing ability may be increased.

However, if the oxidizing ability is too high, $SiO_2$ or $Fe_2SiO_4$ (Faylite) oxide is densely formed on the surface of the steel sheet. As such, when the dense oxide is formed, the oxide serves as an obstacle to prevent penetration of oxygen in a depth direction, and as a result, the oxide prevents penetration of oxygen into the steel sheet.

Accordingly, since proper oxidizing ability for decarburization is present, in a component system in the exemplary embodiment of the present invention, decarburization occurs well and the proper oxide layer is formed in a dew point atmosphere of 60 to 70° C. (50% $N_2$+50% $H_2$) in a temperature range of 800 to 890° C.

Further, as such, when the decarburization annealing is completed by controlling a decarburization atmosphere during the decarburization annealing, the oxygen amount of the oxygen layer on the surface of the steel sheet is in a range of 600 to 1,000 ppm.

As such, when in the oxide layer formed on the surface of the steel sheet during the decarburization annealing, a weight ratio of $SiO_2/Fe_2SiO_4$ is 0.1 to 1.5 or/and the oxygen amount of the oxygen layer is in the range of 600 to 1,000 ppm, in the secondary recrystallization annealing process, Mg is diffused in a direction of the base steel sheet to form forsterite penetrating into the base steel sheet in a hook form or an anchor form.

As such, optimal first recrystal grains that form the Goss orientation are formed in the steel sheet while being subjected to the first recrystallization annealing process including the decarburization annealing.

After the primary recrystallization annealing is completed, secondary recrystallization annealing is performed after applying an annealing separator containing MgO as a main component on the steel sheet.

The annealing separator is used in a slurry form by containing MgO as a main component and mixing a Ti compound, a Cl compound, a sulfide, a boride, a nitride, or an oxide as a reaction promoter singly or in plural. Since the annealing separator is the slurry form, the annealing separator is applied on the steel sheet by a coating roll and the applied amount is preferably 2.5 to 12 $g/m^2$ per side of the steel sheet.

In the annealing separator, during the secondary recrystallization annealing, MgO as the main component of the annealing separator reacts with $SiO_2$ or/and $Fe_2SiO_4$ of the oxide layer to form a forsterite ($Mg_2SiO_4$) glass coating.

The forsterite coating has an effect on behavior of an inhibitor in the secondary recrystallization annealing process to have an effect on a magnetic characteristic of the electrical steel sheet and has an effect even on a coating characteristic such as adhesion with the base steel sheet after the coating is formed.

For the reason, it is preferred that MgO as the main component of the annealing separator having a mean powder particle diameter of 2.5 µm or less is used, and it is more preferred that MgO as the main component of the annealing separator having the mean powder particle diameter of 2 µm or less is 10% or more.

Meanwhile, the secondary recrystallization annealing is performed by dividing a primary cracking process at 550 to 750° C. and a secondary cracking process at 1,000 to 1,250° C., and in a temperature rising section, the temperature rises to 30 to 100° C. per hour in a temperature section of 650 to 950° C. and rises to 45° C. or less per hour in a temperature section of 950 to 1250° C. In addition, a cracking time in the primary cracking process is 10 minutes or more and a secondary cracking time is 8 hrs or more in order to remove water from the annealing separator. Further, the secondary recrystallization annealing may be performed in a mixed atmosphere of nitrogen and hydrogen up to a secondary cracking temperature and performed in a hydrogen atmosphere after reaching the secondary cracking temperature.

When the secondary recrystallization annealing is performed by applying the annealing separator containing MgO as the main component, in the annealing process, Mg in the annealing separator is diffused into the base steel sheet and Si oxide and Mg generated in the decarburization annealing process are mutually diffused to form forsterite.

The forsterite coating formed at this time is formed in a hook shape or an anchor shape while penetrating into the base steel sheet to three-dimensionally form forsterite having a 3D network structure. As such, when the forsterite coating is formed on the surface of the steel sheet and simultaneously, the coating is formed as the 3D network structure while penetrating into the base steel sheet, the forsterite coating on the surface of the steel sheet strengthens the bonding force with the base steel sheet.

In addition, in the secondary recrystallization annealing process, crystal grains having 110 <001> Goss orientation are first grown from crystals having a Goss nucleus in the steel sheet to manufacture an oriented electrical steel sheet having an excellent electrical characteristic.

As such, when the secondary recrystallization annealing is completed, an insulation coating solution containing metal phosphate is applied to ensure insulation of the electrical steel sheet.

It is preferred that the insulation coating solution uses a coating solution containing colloidal silica and metal phosphate. In this case, the metal phosphate may be Al phosphate, Mg phosphate, or a combination thereof, and the content of Al, Mg, or a combination thereof with respect to the weight of the insulation coating solution may be 15 wt % or more. When the content is less than 15 wt %, the adhesion with the base steel sheet may be deteriorated and the corrosion resistance may be weakened.

Meanwhile, in an exemplary embodiment of the present invention, the case of forming the groove on the steel sheet by the magnetic domain refining process after cold-rolling is described, but in another exemplary embodiment of the present invention, the groove may be formed after the primary recrystallization annealing is completed. Further, in yet another exemplary embodiment of the present invention, the groove may be formed after the secondary recrystallization annealing is completed.

That is, the groove may be formed on the steel sheet by the magnetic domain refining process before the primary recrystallization or after the secondary recrystallization, and in this case, preferably the magnetic domain refining method may be performed by a laser.

Figure 2:
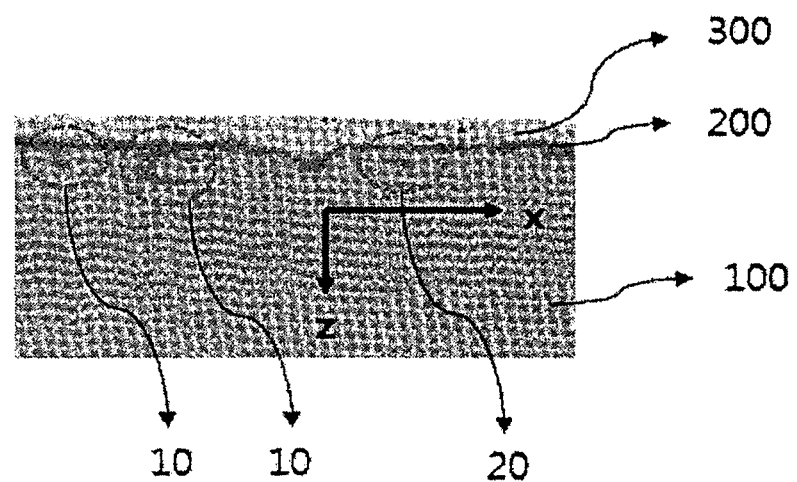
FIG. 2 is a diagram enlarging a portion within 50 μm from a side of the groove in FIG. 1.

The method of forming the groove by the laser is performed by irradiating the laser on the steel sheet driving in a vertical direction (that is, a width direction of the steel sheet) to a rolling direction of the steel sheet. The laser that may be used at this time may use a $CO_2$ laser, a YAG laser, a semiconductor laser, a fiber laser, and the like and as illustrated in FIGS. 1 and 2, if the groove may be formed with a depth and a width enough to exhibit the magnetic domain refining, either a pulse laser or a continuous wave laser may be used. In this case, in order to form the groove in the uniform form, it is preferred that a continuous wave laser in a Gaussian beam form may be used.

When the groove is formed by the laser before the primary recrystallization annealing, if the annealing separator is applied after forming the groove and the insulation coating is performed after the secondary recrystallization annealing, steel sheet—forsterite coating—insulation coating are sequentially laminated in the inside of the groove as well as the surface of the steel sheet.

However, if the groove is formed on the surface of the steel sheet after the secondary recrystallization annealing, the steel sheet—the forsterite coating are sequentially laminated on the surface of the steel sheet, but the steel sheet—the insulation coating are sequentially laminated in the groove by removing the forsterite coating by irradiating the laser. In this case, since the forsterite coating is a glassy coating, the absorption rate of the laser is high, and thus, the glass coating is vaporized to be completely removed or even though not be completely removed, most of the glass coating is removed and only a part remains.

As such, when the forsterite coating is entirely or partially removed in the groove, there is a problem in bonding force between the forsterite coating and the steel sheet on the surface of the steel sheet where the groove is formed, and as a result, the coating layer itself laminated on the surface of the steel sheet may be removed.

Accordingly, it is necessary to secure a bonding structure between the forsterite coating and the steel sheet on the surface of the steel sheet on which the groove formed after the secondary recrystallization annealing is not formed. Hereinafter, this point will be described in detail.

FIG. 1 is a diagram illustrating a cross section of a groove portion of an oriented electrical steel sheet according to an exemplary embodiment of the present invention. FIG. 2 is a diagram enlarging a portion (a display region A of FIG. 1) within 50 μm from a side of the groove in FIG. 1.

As illustrated in FIG. 2, in the oriented electrical steel sheet according to the exemplary embodiment of the present invention, a forsterite coating 200 and an insulation coating 300 are sequentially laminated well on the surface of an electrical steel sheet 100. However, in FIG. 1, unlike a surface of the surrounding steel sheet, the groove formed on the steel sheet is formed with only the insulation coating 300 directly on the steel sheet 100 in the groove while the forsterite coating 200 is removed.

As such, in FIG. 1, the reason why a coating laminate structure in the groove is different from a coating laminate structure on the surface of the steel sheet is that the forsterite coating 200 formed in the secondary recrystallization process is removed by the laser when the groove is formed after the secondary recrystallization annealing.

However, according to the exemplary embodiment of the present invention, when the forester coating is formed, the forsterite coating 200 on the surface of the steel sheet is not separated even though the groove is formed after the second recrystallization annealing.

The reason is that as illustrated in FIG. 2, in the case of the forsterite coating according to the exemplary embodiment of the present invention, the forsterite layer 200 parallel with the surface of the steel sheet is integrally extended downward the steel sheet and penetrates into the base steel sheet 100 to have a 3D network structure.

While the forsterite coating 200 having the 3D network structure has a layered structure in parallel with the surface of the steel sheet, the 3D network structure which is continuously bonded to the coating 200 penetrates into the base steel sheet 100 to be firmly bonded to the base steel sheet 100 like a hook shape or an anchor 10 shape.

The forsterite coating 200 of the 3D integrated network structure may be represented by one point 20 or in a hook shape 10 when viewed from the cross section of the steel sheet. As such, the forsterite coating 200 of the 3D integrated network structure is referred to as an anchor type forsterite coating hereinafter.

In the anchor type forsterite coating according to the exemplary embodiment of the present invention, it is preferred that the number of anchors formed below the forsterite coating may be one or more at the side of the groove formed on the surface of the steel sheet. More particularly, it is more preferred to form two or more anchors within 50 µm on the surface of the steel sheet in a direction starting from the side of the groove and farther from the groove portion.

When the anchor type forsterite coating is formed on the oriented electrical steel sheet manufactured above, even after insulation coating and/or stress relaxation annealing, the forsterite coating may maintain excellent adhesion with the steel sheet. Therefore, as the number of anchors in the anchor type forsterite coating 200 formed on the surface of the electrical steel sheet is increased, it is more advantageous from the viewpoint of adhesion, and thus, the upper limit of the number of anchors is not particularly limited.

In the anchor type forsterite coating layer 200, each of the anchors 10 and 20 is formed while Mg is diffused into the base steel sheet in the secondary recrystallization annealing process and Mg is diffused into the Si oxide generated in the primary recrystallization annealing process.

In the anchor type forsterite coating, a length of each of the anchors 10 and 20, that is, a length when each anchor deeply penetrates in a thickness direction of the electrical steel sheet may be ⅓ or more of a mean thickness of the forsterite coating. Alternatively, the length may be 0.3 to 10 µm. More specifically, the length may be 0.5 to 1 µm, and within the range, the forsterite coating layer on the surface of the steel sheet may maintain excellent adhesion.

In addition, in the anchor type forsterite coating, a width of the anchor, that is, a width in a rolling direction or a width direction of the electrical steel sheet is preferably 0.1 µm to 3.5 µm. In this case, the length and the width of the anchor are based on the cross section of the steel sheet.

Further, referring to FIG. 2, when the rolling direction of the electrical steel sheet is referred to as an x axis (not shown), the width direction of the electrical steel sheet is referred to as a y axis (not shown), a normal direction (thickness direction) of an xy plane is referred to as a z axis, and forsterite penetrating into the base steel sheet in an xz plane is observed, the forsterite anchor may have a hook shape or an anchor shape.

Further, a mean thickness of the forsterite layer 200 except for each of the anchors 10 and 20 of the forsterite penetrating into the base steel sheet 100 may be 0.1 to 3 µm. If the mean thickness of the forsterite layer is less than 0.1 µm, the residual stress after the formation of the groove is small and the iron loss improving effect is not exhibited, and if the mean thickness of the forsterite layer is more than 3 µm, the groove depth deviation may be caused and the magnetic property may be deteriorated.

In FIG. 1, a depth D of the groove may be 3 to 10% of the thickness of the electrical steel sheet. If the depth D is less than 3%, the groove depth for improving the iron loss may not be secured, and if the depth D is more than 10%, the magnetic characteristic of the electrical steel sheet may be weakened by a heat affected portion.

A ratio (a hardness value of the base steel sheet at a portion where the forsterite layer and the base steel sheet contact each other/a hardness value of the base steel sheet at ½ point of the thickness of the base steel sheet thickness) of a hardness value of the base steel sheet at a portion where the forsterite layer and the base steel sheet contact each other and a hardness value of the base steel sheet at ½ point of the thickness of the base steel sheet thickness may be 1.09 to 10. If the ratio is less than 1.09, the adhesion between the forsterite layer and the base steel sheet may be deteriorated, and the iron loss and adhesion may be decreased after formation of the groove and the stress relaxation annealing, and if the ratio is more than 10, a stress deviation between the forsterite layer and the base metal increases and thus, the uniformity of the depth of the groove may be lowered.

In addition, after the magnetic domain refining, the insulation coating layer 300 may be formed by applying an insulation coating solution containing silicate and metal phosphate and heat treatment.

In the case of performing the magnetic domain refining before the secondary recrystallization annealing (hot annealing), since the forsterite layer is formed even on the inner surface of the groove, the insulation coating layer 300 is formed at the top of the forsterite layer present on the inner surface of the groove.

In the case of performing the magnetic domain refining after the secondary recrystallization annealing (hot annealing), since the forsterite layer is not present on the inner surface of the groove, the insulation coating layer 300 is formed directly on the top in the groove (see FIG. 1).

In addition, an angle between the groove and the width direction of the steel sheet may be parallel or 5° or less (not including 0°). The angle between the groove and the width direction of the steel sheet is parallel or 5° or less (not including 0°) to increase an iron loss improvement rate.

The metal phosphate may be Al phosphate, Mg phosphate, or a combination thereof, and the content of Al, Mg, or a combination thereof with respect to the weight of the insulation coating solution may be 15 wt % or more. When the content is less than 15 wt %, adhesion with the base steel sheet is deteriorated and corrosion resistance may be lowered.

Further, the electrical steel sheet may further include Si: 2.5 to 4.0 wt %, C: 0.02 to 0.10 wt %, Al: 0.02 to 0.04 wt %, Mn: 0.05 to 0.20 wt %, N: 0.002 to 0.012 wt %, S: 0.001 wt % to 0.010 wt % and P: 0.01 to 0.08 wt % based on the entire composition 100 wt % of the electrical steel sheet and the remainder may include Fe and impurities. The reason for limiting the components of the electrical steel sheet is the same as that for limiting the components of the slab.

Hereinafter, the present invention will be described in detail through Examples. However, the following Examples just exemplify the present invention, and the contents of the present invention are not limited by the following Examples.

A slab including O: 0.0050 wt %, Si: 3.0 wt %, C: 0.05 wt %, Al: 0.03 wt %, Mn: 0.07 wt %, N: 0.003 wt %, S: 0.005 wt % and P: 0.02 wt % and the remainder of Fe and impurities was prepared. The slab was heated at 1100° C. and then hot-rolled to manufacture a hot-rolled steel sheet. Thereafter, the hot-rolled steel sheet was cold-rolled to manufacture a cold-rolled steel sheet having a thickness of 0.23 mm.

In addition, the cold-rolled steel sheet manufactured above was maintained in a mixed gas atmosphere of hydrogen, nitrogen and ammonia at an annealing temperature of 865° C. and a dew point of 65° C. (50% $N_2$+50% $H_2$) for 200 seconds to perform decarburization annealing and nitriding annealing.

Thereafter, an annealing separator containing MgO as a main component and mixing a Ti compound as a reaction promoter was applied to be 8 $g/m^2$ per side of the steel sheet, and then the steel sheet was subjected to the secondary recrystallization annealing in a coil form.

During the secondary recrystallization annealing, a primary cracking temperature was 700° C. and a secondary cracking temperature was 1,200° C., and in a temperature rising condition in a temperature rising section, the temperature rose to 40° C. per hour in a temperature section of 700 to 950° C., and to 20° C. per hour in a temperature section of 950 to 1,200° C. At this time, the annealing atmosphere was set to a mixed gas atmosphere of 25 volume %: $N_2$ and 75 volume %: $H_2$ when the temperature rose to 1200° C. and after reaching 1200° C., the temperature was maintained at 100 volume %: $H_2$ atmosphere for 10 hours and then slowly cooled.

Thereafter, a groove having a depth illustrated in Table 1 was formed on the surface of the steel sheet by irradiating a continuous wave fiber laser on the surface of the electrical steel sheet. In this case, the used laser used a continuous wave fiber laser with a Gaussian beam shape and an output power of 900 W.

Next, an insulation coating solution containing colloidal silica and metal phosphate was insulation-coated on the surface of the electrical steel sheet on which the grooves were formed. At this time, the metal phosphate of the insulation coating solution used Al phosphate, and the content of Al phosphate used an insulation coating solution containing Al phosphate: 50 wt % based on the entire weight of the insulation coating solution.

TABLE 1

| Insulation coating solution | Groove depth μm | Length of forsterite anchor μm | Number of forsterite anchors Number | Before laser irradiation $W_{17/50}$ | After insulation coating | Iron loss improvement rate % | Close contacting property Φ, mm |
|---|---|---|---|---|---|---|---|
| Al phosphate: 50 wt % | 10.5 | 0.5 | 2 | 0.87 | 0.80 | 8.0 | 15 |
| | 11.2 | 1.0 | 2 | 0.86 | 0.75 | 12.8 | 15 |
| | 11.2 | 1.0 | 4 | 0.86 | 0.72 | 16.3 | 15 |
| | 13.3 | 1.5 | 4 | 0.86 | 0.70 | 18.6 | 10 |
| Al phosphate: 5 wt % | 12.3 | 1.0 | 0 | 0.86 | 0.84 | 2.3 | 30 |

In Table 1, the length of the forsterite anchor means a length in a thickness direction of the electrical steel sheet of the forsterite anchor extending from the forsterite layer existing within 50 μm from the side of the groove and penetrating into the base steel sheet.

In Table 1, the O content in the slab was fixed to 0.0050 wt %, and the weight ratio of $SiO_2/Fe_2SiO_4$ formed in the first recrystallization annealing process was changed to 0.05 to 2 to adjust the length and the number of forsterite anchors while experiment.

In Table 1, the number of forsterite anchors means the number of forsterite anchors extending from the forsterite layer within 50 μm from the side of the groove and penetrating into the steel sheet.

In Table 1, the adhesion is represented by a minimum arc diameter without peeling of the coating when a specimen is bent in contact with the arc of 10, 20, 30 to 100 mm Φ.

Referring to Table 1, it can be seen that when the scope of the present invention is satisfied, the iron loss improvement rate is excellent and excellent adhesion is ensured.

Although the exemplary embodiments of the present invention have been described with reference to the accompanying drawings as described above, those skilled in the art will be able to understand that the present invention can be implemented in other detailed forms without changing the technical spirit or an essential characteristic.

Therefore, it should be understood that the above-described Examples are illustrative in all aspects and are not restrictive. The scope of the present invention is represented by the claims to be described below rather than the detailed description, and it is to be interpreted that the meaning and scope of the claims and all the changes or modified forms derived from the equivalents thereof come within the scope of the present invention.

DESCRIPTION OF SYMBOLS

10: Anchor
20: Anchor
100: Base steel sheet
200: Forsterite layer
300: Insulation coating

The invention claimed is:

1. An oriented electrical steel sheet comprising:
a groove existing on a surface of the electrical steel sheet;
a forsterite layer formed on a part or all of the surface of the electrical steel sheet; and
an insulation coating layer formed on the forsterite layer,
wherein two or more forsterite anchors having a 3D network structure which is formed on a base steel sheet are present within 50 μm from a surface of a side of the groove,
wherein the insulation coating layer is formed directly on an inner surface of the groove,
wherein a width of the forsterite anchor having the 3D network structure which is formed to the base steel sheet is 3.5 μm or less, and
wherein the 3D network structure has a vertical portion and a horizontal portion extended from the vertical portion, and the horizontal portion is in the same direction as the X-Y plane of the forsterite layer, where X is a direction of width of the forsterite layer and Y is length of the forsterite layer.

2. The oriented electrical steel sheet of claim 1, wherein:
the forsterite anchor having the 3D network structure which is formed to the base steel sheet has a length of ⅓ or more of a mean thickness of the forsterite layer.

3. The oriented electrical steel sheet of claim 2, wherein:
a length in a thickness direction of the electrical steel sheet of the forsterite anchor having the 3D network structure which is formed to the base steel sheet is 0.3 to 10 μm.

4. The oriented electrical steel sheet of claim 1, wherein:
when a rolling direction of the electrical steel sheet is referred to as an x axis, a width direction of the electrical steel sheet is referred to as a y axis, a normal direction of an xy plane is referred to as a z axis, and the forsterite anchor having the 3D network structure which is formed to the base steel sheet is observed in an xz plane, the forsterite anchor has a hook shape or an anchor shape.

5. The oriented electrical steel sheet of claim 4, wherein:
a mean thickness of the forsterite layer is 0.1 μm to 3 μm.

6. The oriented electrical steel sheet of claim 5, wherein:
the insulation coating layer includes silicate and metal phosphate, and
the insulation coating layer includes 25 wt % or more of Mg or Al based on the weight of the insulation coating layer.

7. The oriented electrical steel sheet of claim 6, wherein:
a depth of the groove is 3% to 10% of the thickness of the electrical steel sheet.

8. The oriented electrical steel sheet of claim 7, wherein:
an angle between the groove and a width direction of the steel sheet is parallel or more than 0° and 5° or less.

9. A manufacturing method of an oriented electrical steel sheet according to claim 1, comprising:
manufacturing a cold-rolled steel sheet by heating at 1300° C. or less, hot-rolling, and then cold-rolling a slab including O: 0.0020 to 0.0080 wt % and a remainder of Fe and impurities based on the entire composition 100 wt % of the slab;
subjecting the cold-rolled steel sheet to primary recrystallization annealing;
applying an annealing separator containing MgO to the steel sheet subjected to the primary recrystallization annealing and subjecting the steel sheet to secondary recrystallization annealing; and
refining a magnetic domain by forming the groove on the steel sheet, wherein the refining of the magnetic domain is performed after the manufacturing of the cold-rolled steel sheet, after the primary recrystallization annealing is completed, or after the secondary recrystallization annealing is completed, and
a weight ratio of $SiO_2/Fe_2SiO_4$ of an oxide layer on the surface of the steel sheet formed in the primary recrystallization annealing process is 0.1 to 1.5,
wherein the forsterite coating and the insulation coating are sequentially formed on the surface of the electrical steel sheet, and the forsterite coating is integrally extended in a lower direction of the electrical steel sheet and penetrates to form the two or more forsterite anchors having the 3D network structure.

10. The manufacturing method of an oriented electrical steel sheet of claim 9, wherein:
the primary recrystallization annealing is performed in a dew point atmosphere of 60 to 70° C. (50% $N_2$+50% $H_2$) in a temperature range of 800 to 890° C.

11. The manufacturing method of an oriented electrical steel sheet of claim 10, wherein:
an oxygen amount of the oxygen layer on the surface of the steel sheet formed in the primary recrystallization annealing process is in a range of 600 to 1,000 ppm.

12. The manufacturing method of an oriented electrical steel sheet of claim 9, wherein:
the annealing separator is applied with 2.5 to 12 g/m² per side of the steel sheet in a slurry form by containing MgO as a main component and mixing a Ti compound, a Cl compound, a sulfide, a boride, a nitride, or an oxide as a reaction promoter singly or in plural therein,
MgO as the main component of the annealing separator has a mean powder particle diameter of 2.5 μm or less, and
MgO as the main component of the annealing separator having a mean powder particle diameter of 2 μm or less is 10% or more.

13. The manufacturing method of an oriented electrical steel sheet of claim 9, wherein:
the secondary recrystallization annealing is performed by dividing a primary cracking process at 550 to 750° C. and a secondary cracking process at 1,000 to 1,250° C., and during temperature rising, the temperature rises to 30 to 100° C. per hour in a temperature section of 650 to 950° C. and rises to 45° C. or less per hour in a temperature section of 950 to 1250° C.

14. The manufacturing method of an oriented electrical steel sheet of claim 13, wherein:
in the secondary recrystallization annealing, the primary cracking time is 10 minutes or more and the secondary cracking time is 8 hours or more.

15. The manufacturing method of an oriented electrical steel sheet of claim 14, wherein:
the secondary recrystallization annealing is performed in a mixed atmosphere of nitrogen and hydrogen up to the secondary cracking temperature and performed in a hydrogen atmosphere after reaching the secondary cracking temperature.

16. The manufacturing method of an oriented electrical steel sheet of claim 9, wherein:
the refining of the magnetic domain is performed by irradiating a continuous wave laser in a Gaussian beam form.

17. The manufacturing method of an oriented electrical steel sheet of claim 16, further comprising:
insulation-coating with an insulation coating solution containing colloidal silica and metal phosphate on the steel sheet after the refining of the magnetic domain,
the metal phosphate in the insulation coating solution is Al phosphate, Mg phosphate, or a combination thereof, and the content of Al, Mg, or a combination thereof with respect to the weight of the insulation coating solution is 15 wt % or more.

18. The manufacturing method of an oriented electrical steel sheet of claim 9, wherein:
the slab further includes Si: 2.5 to 4.0 wt %, C: 0.02 to 0.10 wt %, Al: 0.02 to 0.04 wt %, Mn: 0.05 to 0.20 wt %, N: 0.002 to 0.012 wt %, S: 0.001 wt % to 0.010 wt % and P: 0.01 to 0.08 wt % based on the entire composition 100 wt % of the slab.

* * * * *